United States Patent
Landry et al.

(10) Patent No.: US 8,264,499 B1
(45) Date of Patent: Sep. 11, 2012

(54) ENHANCING VIEWABILITY OF INFORMATION PRESENTED ON A MOBILE DEVICE

(75) Inventors: Shane Jeremy Landry, Overland Park, KS (US); Harry H. Lai, Overland Park, KS (US); Michael Joseph DeVries, Stillwell, KS (US); Christine Schumaker, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 738 days.

(21) Appl. No.: 12/476,807

(22) Filed: Jun. 2, 2009

(51) Int. Cl.
- G09G 5/00 (2006.01)
- G09G 5/02 (2006.01)
- G06K 9/00 (2006.01)
- G06K 9/40 (2006.01)
- H04N 5/57 (2006.01)
- G06F 17/00 (2006.01)
- G06F 3/00 (2006.01)
- H04N 7/00 (2006.01)
- H04N 17/04 (2006.01)

(52) U.S. Cl. ........ 345/589; 345/581; 345/594; 345/617; 345/690; 348/179; 348/552; 348/557; 348/603; 348/518; 358/518; 382/167; 382/254; 382/274; 715/273; 715/275; 715/700

(58) Field of Classification Search .......... 345/428, 345/581, 589–591, 593–594, 600, 617–619, 345/629–630, 547–549, 690, 204; 348/177–179, 348/254, 552, 553, 557, 602–603; 382/162, 382/167, 254, 274; 358/518–519; 715/273, 715/275, 700

See application file for complete search history.

(56) References Cited

U.S. PATENT DOCUMENTS

| | | | |
|---|---|---|---|
| 6,285,413 B1 | 9/2001 | Akbayir | |
| 6,373,499 B1 | 4/2002 | Acker | |
| 7,054,488 B2 | 5/2006 | White | |
| 7,130,461 B2 | 10/2006 | Rosenholtz | |
| 7,333,654 B2 | 2/2008 | Luo | |
| 7,444,017 B2 | 10/2008 | Gallagher | |
| 2007/0067269 A1* | 3/2007 | Rudge et al. | 707/3 |
| 2009/0119678 A1* | 5/2009 | Shih et al. | 719/313 |
| 2010/0088639 A1* | 4/2010 | Yach et al. | 715/825 |
| 2011/0091092 A1* | 4/2011 | Nepomniachtchi et al. | 382/139 |
| 2011/0242122 A1* | 10/2011 | Bose et al. | 345/545 |

* cited by examiner

Primary Examiner — Wesner Sajous (57) ABSTRACT

A method, system, and media are provided for enhancing viewability of information presented on a mobile device. The media includes presenting a user interface on a mobile device that includes foreground information that overlaps a background image. The background image may be converted into a first set of color values and the foreground information into a second set of color values. A dominant color may be determined for the background image and foreground information. The dominant colors may be used to calculate a contrast ratio that may be compared to a threshold value. At least a portion of the color values may be modified when the contrast ratio is less than the threshold value. A set of modified color values may then be derived and a modified presentation may be presented to the user that includes the modified color values.

20 Claims, 6 Drawing Sheets

ENHANCING VIEWABILITY OF INFORMATION PRESENTED ON A MOBILE DEVICE

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

Mobile devices allow a user to customize and personalize the display of the device. For instance, a user is able to freely choose the image that they want to assign as the screensaver or wallpaper for the display. This image may be their latest vacation picture, their favorite team's sports logo, their favorite graphics, etc. One problem with this is that the relatively small display area on a mobile device can make it difficult for a user to view or read the information presented on top of the background image. For example, a user may choose a digital photo that includes the same colors as an icon included on the display causing that icon to "fade" or "disappear" into the background. For instance, consider a user interface that displays a bright-blue sky image in the background and a bright-blue icon in the foreground, with the icon overlapping the sky image. In this scenario, the bright-blue icon would merge into the blue background making it hard for the user to identify the icon to access the features related to that icon.

One possible option might be to provide a uniform colored box (e.g., a black box) around the icon having a different color from the background image. The first problem with this is that the size of the display of the mobile device begins to limit how many uniform boxes can be presented around each icon before the background image is completely blocked out by these boxes. In addition, these boxes might cover up portions of the image the user would really like to display. Second, the background image may include numerous colors, and there might not be one uniform color that can distinguish the icon from the background image.

A second possible option might be to use an image-editing program to modify the image before loading it onto the mobile device. The problem with this option is that the user must be savvy on how to operate these programs. More importantly, these programs operate in isolation of the icons and other information displayed on the mobile device. This requires the user to transfer the image back and forth between a computer and the device in hopes of finding the correct balance. This is time consuming and inefficient. Thus, embodiments of the present invention provide systems, methods, and media for enhancing the viewability of information presented on a mobile device. In particular, the mobile device takes into account both the properties of the image and the properties of the information displayed on the mobile device to automatically adjust the information presented on the device.

In a first aspect, a method is provided for enhancing the viewability of information presented on a mobile device. The method includes, in one embodiment, presenting on a display of a mobile device a user interface that includes foreground information that overlaps a background image. The method continues with converting the background image into a first set of color values and the foreground information into a second set of color values. A first dominant color is determined of the background image and a second dominant color is determined of the foreground information.

The method continues by calculating a contrast ratio based on the first and second dominant colors and compares the contrast ratio to a threshold value. The method may then modify at least a portion of the first or second set of color values when the contrast ratio is less than the threshold value until the contrast ratio is at least equal to the threshold value. The modification of the color values may create a first set of modified color values derived from the first set of color values and a second set of modified color values derived from the second set of color values. The method concludes with presenting a modified presentation that includes one or more of the first or second set of modified color values.

In a second aspect, a method is provided for enhancing the viewability of information presented on a mobile device. The method includes, in one embodiment, presenting on a display of a mobile device a user interface that includes a background and a foreground. The method continues with displaying an image in the background and an interface element in the foreground that overlaps a portion of the image. The method then adjusts the opacity of the image to produce an altered image. The opacity of the image may be adjusted by a user or may be automatically adjusted by an application running on the mobile device. This automatic adjustment may occur until the contrast ratio between the image and the interface element is equal to or greater than a threshold value. The method concludes by displaying the interface element on the foreground and the altered image on the background. The image and altered image may include a digital picture.

In a final illustrative aspect, a method is provided for enhancing the viewability of information presented on a mobile device. The method includes presenting a user interface that includes a background and a foreground on a display of the mobile device. The method continues with displaying an image in the background having a first pixel area that includes a plurality of pixels. The method also provides displaying an interface element in the foreground having a second pixel area that includes a plurality of pixels, where at least a portion of the second pixel area overlaps at least a portion of the first pixel area.

The method further includes associating a boundary with the first pixel area and the second pixel area. A first portion of the first pixel area that is located within a first distance from the boundary is converted into a first set of color values, and a second portion of the second pixel area that is located within a second distance from the boundary is converted into a second set of color values. The method continues with determining a first dominant color of the first portion of the first pixel area, and a second dominant color of the second portion of the second pixel area.

The method further includes calculating a contrast ratio based on the first and second dominant colors and comparing the contrast ratio to a threshold value. The method may then modify at least a portion of the first or second set of color values when the contrast ratio is less than the threshold value. This modification may occur until the contrast ratio is at least equal to the threshold value. In addition, the modification may create a first set of modified color values derived from the first set of color values, and a second set of modified color values derived from the second set of color values. The method may conclude by presenting a modified presentation that includes one or more of the first or second set of modified color values.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CDMA | Code Division Multiple Access |
| FDMA | Frequency Division Multiple Access |
| GPRS | General Packet Radio Service |
| GSM | Global System for Mobile Communications |
| IEEE | Institute of Electrical and Electronic Engineers |
| I/O | Input/Output |
| OFDMA | Orthoginal Frequency Division Multiple Access |
| PDA | Personal Data Assistant |
| TDMA | Time Division Multiple Access |
| WiMAX | World-Wide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
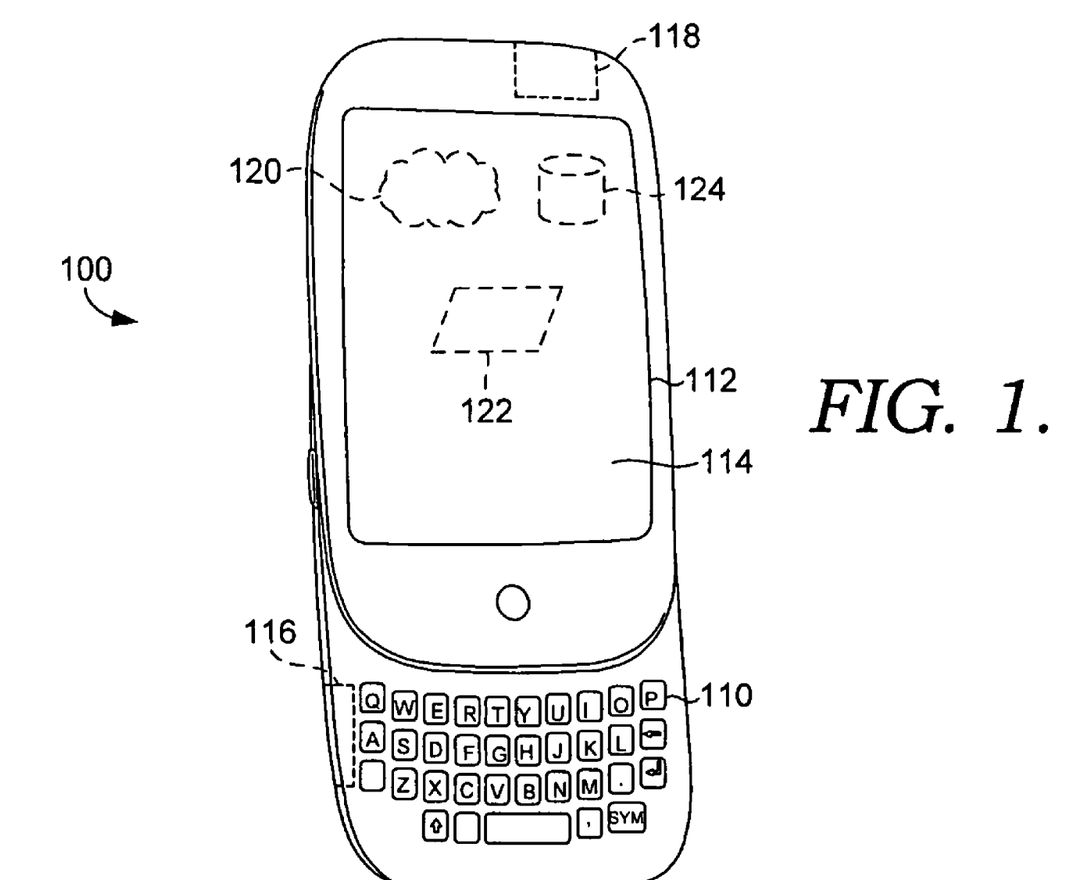
FIG. 1, depicts an illustrative mobile device suitable for practicing an embodiment of the present invention.

Turning now to FIG. 1, an illustrative mobile device is provided and referenced generally by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a PDA. This description does not intend to convey bright-line distinctions between the different types of mobile devices. Indeed, what one might refer to as a PDA, another might refer to as a mobile device or cell phone or even a PC.

Mobile device 100 may include a keypad 110 and a display 112. Display 112 includes a user interface 114 which is suitable for presenting information on mobile device 100. Generally, keypad 110, display 112, and user interface 114 provide an input/output (I/O) interface that a user may engage to interact with device 100. For example, display 112 may include a touch screen that a user may scratch or touch to interact with device 100. This interaction may include selecting an image to display in the background of user interface 114.

In addition, mobile device 100 includes a battery 116 and a radio 118. Battery 116 provides a source of power for mobile device 100 and may include a rechargeable battery. Radio 116 enables device 100 to communicate with other devices via a wireless technology. This wireless technology may include, but is not limited to, Time Division Multiple Access (TDMA), Frequency Division Multiple Access (FDMA), Orthogonal Frequency Division Multiple Access (OFDMA), Code Division Multiple Access (CDMA), GSM (Global System for Mobile Communications), GPRS (General Packet Radio Service), or WiMAX (World-Wide Interoperability for Microwave Access) technology.

Device 100 may also include control software 120, memory 122, and data structure 124. Control software 120 carries out various functional aspects and might take on a variety of forms. For example, the control software might include configuration settings, might facilitate communicating data between multiple devices, might handle updates, include user settings, etc. Specifically, control software 120 may be used to implement a method for enhancing viewability of information presented on user interface 114 of mobile device 100. For example, control software 120 may convert images and information displayed on user interface 114 into color values that can be modified to present a visually enhanced version of the original images and information displayed on mobile device 100.

Memory 122 may include a data structure 124 that stores and facilities the operation of control software 120. For example, memory 120 may store data relating to an image and/or information displayed on user interface 114, as well as modified versions of the image and/or information. In addition, memory 120 may store firmware and other various software modules and components that might be present in mobile device 100. These modules and components may be used in embodiments of the present invention to enhance the viewability of information presented on mobile device 100. Other examples of illustrative software include things such as the operating system of a phone, third-party applications such as games, programs to watch television on the device, ring tones, location-based services, contact information, and the like. In sum, FIG. 1 is not meant to indicate all, or even major, systems or components of mobile communications device 100. An overview of mobile communications device 100 is presented and certain components are listed so as to be able to refer to them throughout this disclosure.

Figure 2:
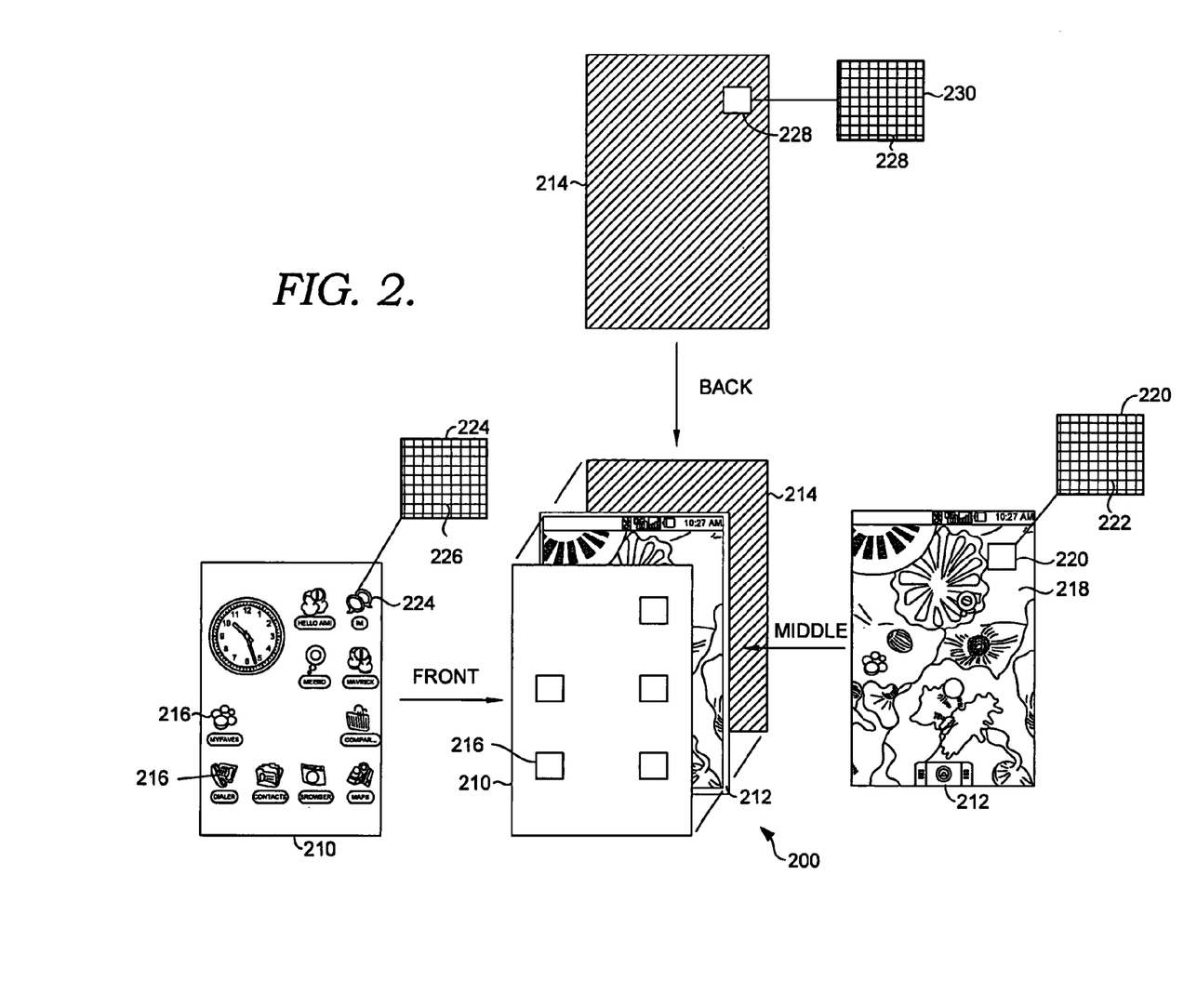
FIG. 2, depicts an illustrative user interface suitable for practicing an embodiment of the present invention.

Turning now to FIG. 2, an illustrative user interface is provided and referenced generally by the numeral 200. User interface 200 is illustrated with three layers or levels of display. These layers or levels include a foreground 210, a background 212, and a backdrop 214. These layers are not necessarily physically distinct from one another, but instead are illustrated in this manner to facilitate the discussion and indicates a hierarchy of how information is displayed and presented to a user on mobile device 100.

Foreground 210 may include foreground information and interface element 216 that may be displayed on top of or over other information displayed on the other layers of user interface 200. Foreground information 216 may include icons, graphics, or any other interface elements. Generally speaking, foreground information 216 provides links to applications on mobile device 100. For example, FIG. 2 illustrates a plurality of icons that may be displayed in foreground 210. Specifically, FIG. 2 illustrates an "IM" icon that when selected launches an instant messaging session, a "MYFAVES" icon that when selected launches a web browser, etc. In addition, foreground information may include pop-up displays or alerts that are triggered by an application running on mobile device 100. For example, an appointment reminder or an instant messaging alert could be displayed in foreground 210 and may even be displayed over similar information displayed in foreground 210. Finally, foreground information 216 may include information that is not linked to an application. For example, FIG. 2 illustrates a depiction of an analog clock that provides the current time to a user and may or may not launch a related application.

Background 212 may include a background image or image 218. Background image 218 may include a digital image, graphics, or any other suitable information that is desired for display in background 212. Background image 218 may encompass the entire area of background 212 or only a small portion. Likewise, foreground information 216 may include a number of interface elements displayed in discreet portions of foreground 210. FIG. 2 illustrates image 218 generally encompassing the entire background 212, and a number of interface elements 216 displayed in discrete portions of the foreground 210.

User interface 200 may include backdrop 214 which is a third possible layer or level. Backdrop 214 may be a uniform color to provide general shading or illumination for user interface 200. For example, if background image 218 and/or foreground information 216 do not completely fill foreground 210 and background 212, then backdrop 214 may provide a uniform color to cover the remaining display area of user interface 200.

As seen in FIG. 2, user interface 200 is a combination of foreground 210, background 212, and backdrop 214. That is, each layer may be overlaid or overlapped onto one another and combined to provide user interface 200. Again, these are not necessarily distinct physical layers from one another, although they may be if a device supports such physical layering. Instead, the layer concept is used to illustrate that each layer provides a hierarchy of how information in that layer will be presented with respect to information in the other layers. Although three layers are illustrated in FIG. 2, embodiments of the present invention may implement less than three or more than three layers. Likewise, the hierarchy of each layer may be changed as desired. FIG. 2 illustrates an example where foreground information 216 appears in front of background image 218 which appears in front of backdrop 214.

Each of the information provided in foreground 210, background 212, and backdrop 214 may include a number of pixels with each pixel having color values. These color values may include monochrome or RGB values having various bit sizes or levels. For example, embodiments of the present invention may make use of a 256 color palette to display the information in foreground 210 and background 212. Specifically, background image 218 may include a first set of color values and foreground information 216 may include a second set of color values. FIG. 2 illustrates an enlarged view of a portion of a first pixel area 220 of background image 218 that includes a plurality of pixels 222. Again each pixel 222 of pixel area 220 may have the same or different color value from the pixels adjacent to it.

Likewise FIG. 2 illustrates an enlarged view of a portion of a second pixel area 224 of foreground information 216 that includes a plurality of pixels 226. Similarly, backdrop 214 may include a third pixel area 228 having a plurality of pixels 230. FIG. 2 illustrates an enlarged view of a portion of a third pixel area 228 of backdrop 214 that includes a plurality of pixels 228. Again, each pixel in each pixel area 220, 224, 228 may have the same or a different color value from the pixels adjacent to it.

As discussed foreground 210, background 212 and backdrop 214 are combined or overlap one another to create user interface 200. This combination results in each pixel area associated with the foreground, background, and backdrop overlapping. As discussed above, having similar color values for each of the pixel areas can decrease clarity of the foreground information and the background image causing them to blur together. This makes it difficult for the user to view the foreground information and/or see the background image. Thus, embodiments of the present invention seek to enhance the viewability of the information presented on user interface 200.

Figure 3:
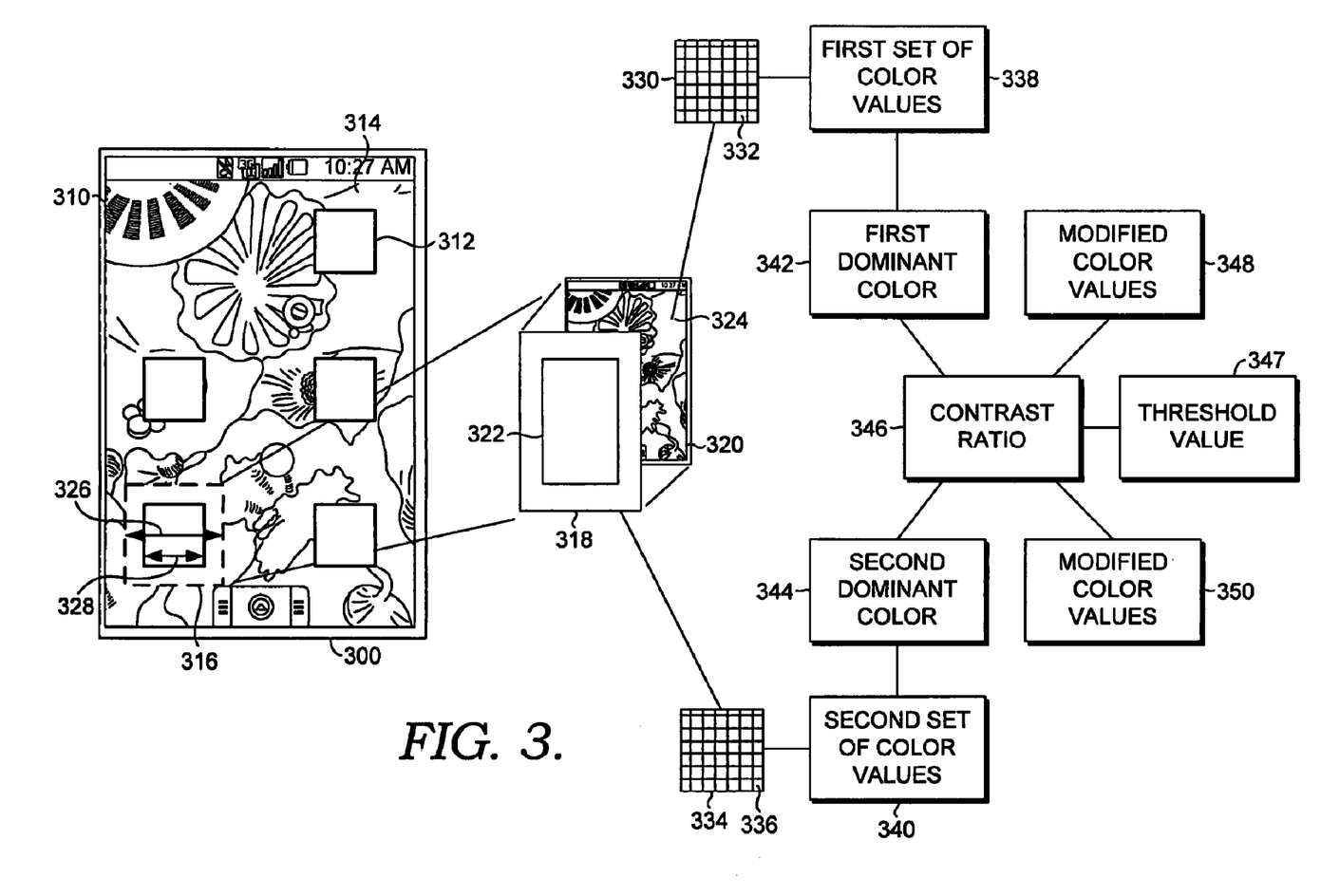
FIG. 3, depicts an illustrative schematic for enhancing the viewability of information presented on a mobile device.

Turning now to FIG. 3, and with reference to FIG. 2, a schematic diagram illustrates one embodiment of enhancing the viewability of the information presented on a mobile device. A user interface 300 is illustrated in FIG. 3, with foreground 210 combined with background 212 and backdrop 214. The figure further illustrates background image 310 displayed in background 212, foreground information or interface elements 312 displayed in foreground 210, and backdrop 314. In FIG. 3, foreground information 312 is illustrated as blank boxes, but it is understood that these boxes represent interface elements similar to the ones displayed in FIG. 2. This was done to facilitate the discussion because interface elements 216 would be hard to distinguish if they were presented with background image 310 in FIG. 3. Thus, it is understood that the blank boxes illustrated in FIG. 3 represent any possible interface element or foreground information.

In general, FIG. 3 illustrates an enlarged view of an area of user interface 300, along with a schematic representation of how an embodiment of the present invention would enhance the viewability of the information presented. Specifically, a portion 318 of foreground 210 is illustrated in front of a portion 320 of background 212. Portion 318 includes a portion 322 of foreground information and a portion 320 includes a portion 324 of background image 310. It should be noted that even though this example addresses a discrete area of user interface 300, it by no means limits embodiments of the present invention to discrete portions of user interface 300. In fact, embodiments of the present invention may operate on the entire display of user interface 300. However, in the situation where a discrete area is selected, this area may be associated with boundary 316. That is, the portion of foreground information 322 and background image 324 selected may be determined with relation to boundary 316. For example, the pixel area to be operated on may be within a distance from boundary 316. FIG. 3 illustrates a first pixel area 330 for background image 324 located within a first distance 326 of boundary 316. The figure also illustrates a second pixel area 334 for an interface element 318 located within a second distance 328 of boundary 316. As discussed, each of these pixel areas includes a plurality of pixels 332, 336.

One embodiment of the present invention enhances the viewability of information presented on a mobile device by operating on these pixel areas. Each pixel 332 in first pixel area 330 may be converted into a first set of color values 338 and each pixel 336 in second pixel area 334 may also be converted into a set of second color values 340. In addition, either first pixel area 330 or second pixel area 334 may include pixels of backdrop 214 as part of a composite color value for each pixel, or the related pixel area for backdrop 214 may be a separate set of color values. These color values can be used to determine a dominant color value for each set of color values. Specifically, a first dominant color 342 can be determined for first set of color values 338 and a second dominant color 344 can be determined for second set of color values 340. The dominant color for each set may be determined in a number of ways. For example, the dominant color may be the color value occupying the largest amount of pixels for pixel areas 330, 334. In other words, first dominant color 342 would include the color value having the highest number of counts within pixel area 330. Likewise, second dominant color 344 would include the color value having the highest number of counts within pixel area 334.

Alternatively, instead of determining the dominant color based on the color value having the highest number of counts within a pixel area, an average dominant color may be determined for a pixel area based on a range of color shades. For example, a digital image of a flower may include petals that contain a variety of red shades, but not one dominant repeated color value. If this image also includes a blue sky, the pixels representing the sky may have a higher number of counts than any single color value within the range of red color shades. In this alternative embodiment, the dominant color would be determined by taking an average of the red color values instead of the single blue color value of the sky.

Dominant colors 342, 344 may be used to calculate a contrast ratio 346 to provide an indication of how a user might perceive the viewability of foreground information 322 and background image 324. One possible way of calculating contrast ratio 346 is by taking a difference between first dominant color 342 and second dominant color 344 and dividing the difference by a full scale value to calculate a percentage of the full scale value. For example, a contrast ratio that is not greater than 20% of full scale may be determined to provide poor viewability of information provided on user interface 300. In other words, 20% would establish a threshold value 347 that the contrast ratio could be compared with to provide an objective determination of the viewability of the information displayed.

If contrast ratio 346 is not greater than a threshold value then at least a portion of first set of color values 338 and/or a portion of second set of color values 340 may be modified to produce a first set of modified color values 348 and a second set of modified color values 350, respectively. Contrast ratio 346 can then be recalculated and compared to threshold value 347 based on modified color values 348 and/or 350. Exemplary methods for enhancing the viewability of information presented on a user interface will be discussed in more detail with regard to FIGS. 4-6.

Figure 4:
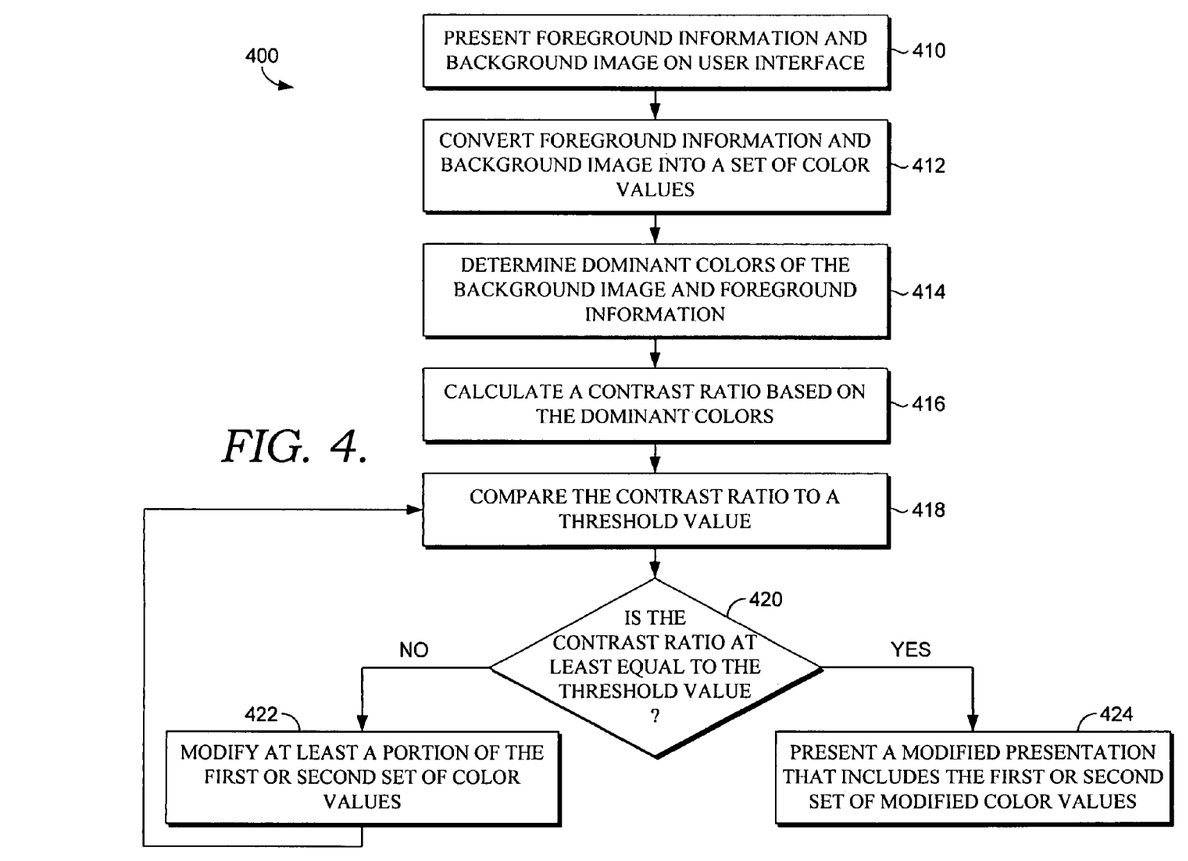
FIGS. 4-6, depict illustrative methods for enhancing the viewability of information presented on a mobile device.

Turning now to FIG. 4, with reference to FIGS. 2 and 3, an illustrative method for enhancing the viewability of information presented on a mobile device according to the embodiment of the invention has been provided and referenced generally by the numeral 400. At a step 410, foreground formation and background image may be presented on a user interface. For example, foreground information 216 and background image 218 are displayed on user interface 200. Again, foreground information 216 can be a portion of foreground 210, or may include the entire foreground area. Likewise, background image 218 may be a portion of background 212 or may include the entire background area.

At a step 412, foreground information and background image are converted into a set of color values. For example, background image 324 may be converted into a first set of color values 338 and foreground information 322 may be converted into a second set of color values 340. As discussed, converting background image 324 into a first set of color values 338 and foreground information 322 into a second set of color values 340 may include determining an RGB value of each pixel 332, 336 of background image 324 and foreground information 322. Determining the RGB value of each pixel may include selecting an RGB value from a 256 color palette. Finally, each RGB may be normalized to a scale that may be used to calculate a contrast ratio. For example, all color values may be normalized to a scale ranging from 0 to 100 or some other gradient.

At a step 414, a first and a second dominant color may be determined for each set of color values. For example, a first dominant color 342 may be determined for background image 324 and a second dominant color 344 may be determined for foreground information 322. As discussed above, one way to determine the dominant color of a set is by identifying the color occupying the greatest pixel area for each set of color values. As illustrated in FIG. 3, the pixel area used to determine the dominant color may be a discrete portion of the background image 310 and foreground information 312. For example, the most dominant colors may be determined for only that portion of foreground information 322 that overlaps background image 324. Likewise, the most dominant color may be determined for a portion that does not overlap and may even be determined for the entire user interface area.

At a step 416, the dominant colors may be used to calculate a contrast ratio. Referring to FIG. 3, a contrast ratio 346 may be calculated based on first dominant color 342 and second dominant color 344. Again, one way to calculate the contrast ratio is to take the difference between the first dominant color 342 and second dominant color 344 and divide the difference by a full scale value. For example, a full scale value of the contrast ratio may be 100. Likewise, the first and second dominant colors may be normalized to that scale. To provide exemplary numbers, assume that a first dominant color value is determined to be 30 and a second dominant color value is determined to be 35. Given these numbers, embodiments of the present invention would calculate a contrast ratio of 5%. Again, this is just one example and not representative of the only contrast scale that may be used, nor is this the only way to calculate a contrast ratio. In sum, the point of the contrast ratio is that it provides an objective number that may be used to determine the level of viewability of information displayed on a user interface.

At a step 418, contrast ratio 346 is compared to threshold value 347. As discussed, threshold value 347 provides the objective standard to which the contrast ratio is compared to determine the viewability of the information displayed on user interface 300. Like the contrast ratio, establishing a threshold is not limited to a specific number or scale. Indeed, threshold value 347 may be a percentage of a full scale value or may be a normalized number. For example, threshold value 347 may be 5%, 10%, or 20%. Thus, similar to the contrast ratio, the purpose of the threshold value is to provide an objective number for determining when the viewability of information displayed on a user interface has reached an acceptable level. In other words, if the contrast ratio is not at least equal to or greater than the threshold value then the viewability of the information displayed on the user interface is not at an acceptable level. Embodiments of the invention may provide a way for a user to manually enter the threshold value or this value may be preset or included as a default value stored in software on the mobile device.

At a step 422, at least a portion of the first and/or second set of color values may be modified when the contrast ratio is less than the threshold value. This modification may include modifying at least a portion of the first set of color values by adjusting the RGB value of each pixel of the background image by a uniform amount. Alternatively, this modification may include modifying at least a portion of the second set of color values by adjusting the RGB value of each pixel of the foreground information by a uniform amount. It may also include modifying a third set of color values for backdrop 214 by a uniform amount. In sum, modifying the color values can include a number of different combinations and iterations. The point is that the modifying the color values will change the contrast ratio that may be compared to the threshold value to determine when the viewability of information on the user interface has reached an acceptable level. If the contrast ratio is at least equal to or greater than the threshold value a modified presentation is presented to a user at a step 424. This modified presentation includes at least a portion of the first set and second set of modified color values.

Figure 5:
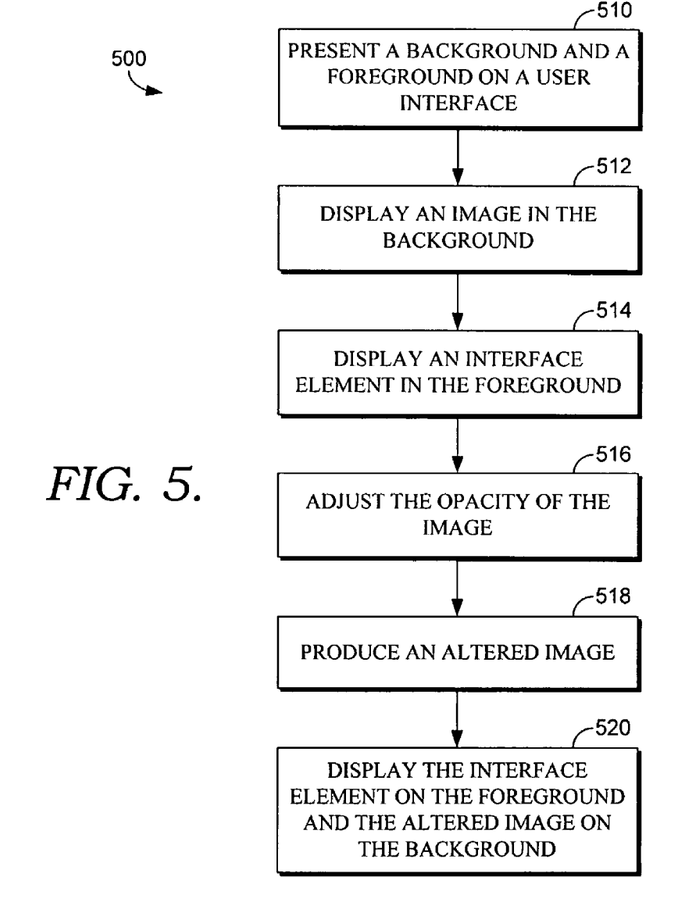

Turning now to FIG. 5, with reference to FIG. 2, an illustrative method for practicing an embodiment for the present invention is provided generally by the numeral 500. At a step 510, background 212 and foreground 210 are presented on a user interface 200. At a step 512 and 514, image 220 is displayed in background 212 and interface element 216 is displayed in foreground 210. In addition to having color values defined at the pixel level, image 220 and interface element 216 may include other properties relating to the image and interface element. For example, image 220 and interface element 216 may include information relating to the opacity of the image and interface element. Generally, opacity is a reference to the transparency of the image/interface element and may be a scaled value. For example, the opacity of an image may be defined on a 0 to 100 scale, with 0 being transparent and 100 being opaque or not transparent. Thus, an image may be lightened or darkened by adjusting the opacity of the image. This provides one property that may be adjusted to increase the viewability of information displayed in user interface 200.

Therefore, at a step 516, the opacity of image 218 may be adjusted as necessary. This adjustment could be based on a contrast ratio calculation, as discussed above, or some other objective measure. For example, a dominant color may be calculated for image 218 and used to determine how much the opacity of the image needs to be modified. In other words, how much the image should be lightened or darkened to improve the viewability of the information presented in user interface 200. Again, this could be based on establishing when one dominant color is too dominant and is blurring the distinction between an image and interface elements.

The opacity adjustment may be implemented by providing an application for mobile device 200 that enables a user to enter a value for the opacity of the image. The opacity adjustment may also be implemented by providing an application for mobile device 200 that automatically adjusts the opacity of the image until a contrast ratio between the image and the interface element is equal to or greater than a threshold value. This application may be included in software 120 and stored in memory 122. Finally, in addition to adjusting the opacity, an embodiment of the present invention may apply a uniform color to background 212 that may also lighten or darken interface element 216 and image 218.

At a step 518, an altered image is produced having a different opacity than the original opacity of image 218. At a step 520, interface element 216 is displayed on foreground 210 and altered image is displayed on background 212. Displaying the altered image on background 212 increases the viewability of interface element 216.

Figure 6:
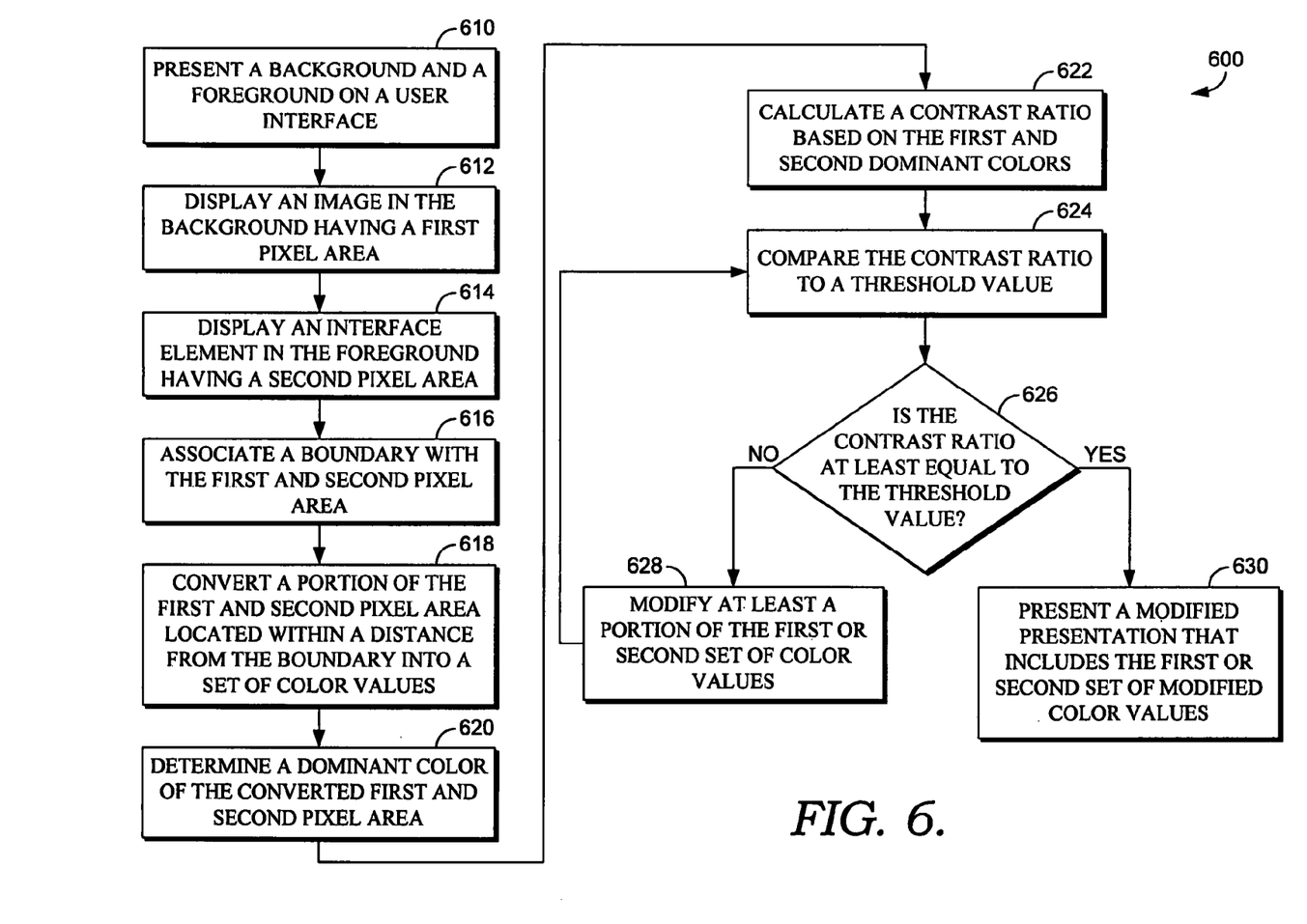

Turning now to FIG. 6, with reference to FIGS. 2 and 3, an illustrative method for enhancing the viewability of information presented on a mobile device according to the embodiment of the invention has been provided and referenced generally by the numeral 600. At a step 610, a background 212 and a foreground 210 may be presented on a user interface. At a step 612, an image 218 may be displayed in background 212 having a first pixel area 220. At a step 614, an interface element 216 may be displayed in foreground 210 having a second pixel area 224. Again, interface element 216 can be a portion of foreground 210, or may include the entire foreground area. Likewise, background image 218 may be a portion of background 212 or may include the entire background area.

At a step 616, boundary 316 is associated with first pixel area 330 and second pixel area 334. The size and shape of boundary 316 may be determined by a number of variables. For example, the shape of the boundary may be based on the shape of the interface element 312. FIG. 3 illustrates interface element 322 as a square box and boundary 316 as a square boundary, but it may be any other shape. For instance, the interface elements 216 displayed in FIG. 2 have different sizes and shapes and could be used to determine the shape of boundary 316. Likewise, the size or area of the boundary may be set based on the size and shape of interface element 216 and/or image 218.

At a step 618, a portion of first pixel area 330 and second pixel area 334 are converted into a set of color values. The portion to be converted is determined by the distance the pixels are from boundary 316. For example, pixels 332 located within a first distance 326 may be converted into a first set of color values 338 and pixels 334 located within a second distance 328 may be converted into a second set of color values 340. As discussed, converting portions of the pixel areas 334, 330 into a set of color values 338, 340 may include determining an RGB value of each pixel 332, 336 of background image 324 and interface element 322.

Additionally, first distance 326 and second distance 328 may be determined in a number of ways. For example, distances 326, 328 may be based on the size of user interface element 312. For instance, for a relatively small interface element on a relatively small user interface, the distance may be 5 to 10 pixels from the boundary. For a larger interface element on a larger user interface the distance may need to be more than 5 to 10 pixels. For instance, a 5 pixel area around a 25 pixel interface element may not provide the needed impact for a 50 pixel interface element. Thus, for larger interface elements the distance may be set based on a percentage of the size of the pixel area of that element. For example, the distance might be set at 30% of the size of the interface element. This would mean that for the 50 pixel element, the distance would be set at approximately 17 pixels. Again, these are only exemplary numbers used to provide an example of how the distance 326, 328 may be calculated.

At a step 620, a first dominant color 342 and a second dominant color 344 may be determined for the converted portions of the first and second pixel area. As discussed above, one way to determine the dominant color of these converted portions is by identifying the color occupying the greatest pixel area for the portion. At a step 622, the dominant colors may be used to calculate contrast ratio 346. Again, one way to calculate the contrast ratio is take the difference between first dominant color 342 and second dominant color 344, and divide the difference by a full scale value. At a step 624, contrast ratio 346 is compared to threshold value 347. As discussed, threshold value 347 provides the objective standard to which the contrast ratio is compared to determine the viewability of the information displayed on user interface 300. Like the contrast ratio, establishing a threshold is not limited to a specific number or scale. Indeed, threshold value 347 may be a percentage of a full scale value or may be a normalized number. Thus, similar to the contrast ratio, the purpose of the threshold value is to provide an objective number for determining when the viewability of information displayed on a user interface has reached an acceptable level.

At a step 626, at least a portion of the first and/or second set of color values may be modified when the contrast ratio is less than the threshold value. This modification may include modifying only color values of pixels included in the first portion of the first pixel area of the image. This modification may include gradually decreasing the modification from a maximum value for pixels located at the boundary to a minimum value for pixels located at the first distance from the boundary. In addition, the modification may include modifying only color values of pixels included in the second pixel area of the interface element. In sum, modifying the color values can include a number of different combinations and iterations. Again, the point is that the modifying the color values will change the contrast ratio that may be compared to the threshold value to determine when the viewability of information on the user interface is an acceptable level. When the contrast ratio is at least equal to or greater than the threshold value, a modified presentation is presented to a user at a step 630. This modified presentation includes at least a portion of the first set and second set of modified color values.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method of enhancing viewability of information presented on a mobile device, the method comprising:
   presenting on a display of said mobile device a user interface that includes foreground information that overlaps a background image;
   converting said background image into a first set of color values;
   converting said foreground information into a second set of color values;
   determining a first dominant color of said background image;
   determining a second dominant color of said foreground information;
   calculating a contrast ratio based on said first and second dominant colors;
   comparing said contrast ratio to a threshold value;
   modifying at least a portion of said first or second set of color values when said contrast ratio is less than said threshold value until said contrast ratio is at least equal to said threshold value, thereby deriving one or more of
      (1) a first set of modified color values derived from said first set of color values, and
      (2) a second set of modified color values derived from said second set of color values; and
   presenting a modified presentation that includes one or more of said first or second set of modified color values.

2. The media of claim 1, wherein converting said background image into a first set of color values and converting said foreground information into a second set of color values includes determining an RGB value of each pixel of said background image and said foreground information.

3. The media of claim 2, wherein determining said RGB value of each pixel includes selecting said RGB value from a 256 color palette.

4. The media of claim 2, further comprising normalizing said RGB value for each pixel.

5. The media of claim 1, wherein determining said first dominant color includes determining a first color value of said first set of color values having a highest number of counts, and determining said second dominant color includes determining a second color value of said second set of color values having a highest number of counts.

6. The media of claim 1, wherein said contrast ratio is calculated by taking a difference between said first dominant color of said background image and said second dominant color of said foreground information, and dividing said difference by a full scale value.

7. The media of claim 1, wherein said first and second dominant color is determined only for that portion of said foreground information that overlaps said background image.

8. The media of claim 1, wherein modifying at least a portion of said first set of color values includes adjusting an RGB value of at least one pixel of said background image by a uniform amount.

9. The media of claim 1, wherein modifying at least a portion of said second set of color values includes adjusting an RGB value of at least one pixel of said foreground information by a uniform amount.

10. The media of claim 1, further comprising a backdrop presented on said user interface that overlaps said foreground information and said background image, wherein said backdrop includes a third set of color values and at least a portion of said third set of color values are modified by a uniform amount.

11. The media of claim 1, wherein said image is a digital picture.

12. One or more non-transitory computer-readable media having computer-executable instructions embodied thereon that, when executed, perform a method of enhancing viewability of information presented on a mobile device, the method comprising:
   presenting on a display of said mobile device a user interface that includes a background and a foreground;
   displaying an image in said background having a first pixel area that includes a plurality of pixels;
   displaying an interface element in said foreground having a second pixel area that includes a plurality of pixels, wherein at least a portion of said second pixel area overlaps at least a portion of said first pixel area;

associating a boundary with said first pixel area and said second pixel area;

converting a first portion of said first pixel area that is located within a first distance from said boundary into a first set of color values;

converting a second portion of said second pixel area that is located within a second distance from said boundary into a second set of color values;

determining a first dominant color of said first portion of said first pixel area;

determining a second dominant color of said second portion of said second pixel area;

calculating a contrast ratio based on said first and second dominant colors;

comparing said contrast ratio to a threshold value;

modifying at least a portion of said first or second set of color values when said contrast ratio is less than said threshold value until said contrast ratio is at least equal to said threshold value, thereby deriving one or more of (1) a first set of modified color values derived from said first set of color values, and (2) a second set of modified color values derived from said second set of color values; and presenting a modified presentation that includes one or more of said first or second set of modified color values.

13. The media of claim 12, wherein modifying at least a portion of said first or second set of color values includes only modifying color values of pixels included in said first portion of said first pixel area of said image.

14. The media of claim 13, wherein only modifying color values of pixels included in said first portion of said first pixel area of said image includes gradually decreasing said modification from a maximum value for pixels located at said boundary to a minimum value for pixels located at said first distance from said boundary.

15. The media of claim 12, wherein modifying at least a portion of said first or second set of color values includes only modifying colors value of pixels included in said second portion of said second pixel area of said interface element.

16. The media of claim 12, wherein said first and second distance from said boundary is determined based on a size of said second pixel area.

17. A method of enhancing viewability of information presented on a mobile device, the method comprising:

presenting on a display of said mobile device a user interface that includes foreground information that overlaps a background image;

converting said background image into a first set of color values;

converting said foreground information into a second set of color values;

determining a first dominant color of said background image;

determining a second dominant color of said foreground information;

calculating a contrast ratio based on said first and second dominant colors;

comparing said contrast ratio to a threshold value;

modifying at least a portion of said first or second set of color values when said contrast ratio is less than said threshold value until said contrast ratio is at least equal to said threshold value, thereby deriving one or more of (1) a first set of modified color values derived from said first set of color values, and (2) a second set of modified color values derived from said second set of color values; and presenting a modified presentation that includes one or more of said first or second set of modified color values.

18. The method of claim 17, wherein converting said background image into a first set of color values and converting said foreground information into a second set of color values includes determining an RGB value of each pixel of said background image and said foreground information.

19. The method of claim 17, wherein determining said first dominant color includes determining a first color value of said first set of color values having a highest number of counts, and determining said second dominant color includes determining a second color value of said second set of color values having a highest number of counts.

20. The method of claim 17, further comprising a backdrop presented on said user interface that overlaps said foreground information and said background image, wherein said backdrop includes a third set of color values and at least a portion of said third set of color values are modified by a uniform amount.

* * * * *